March 8, 1966  R. MARIE  3,239,026
SPEED CONTROL DEVICE FOR AN AUTOMOTIVE VEHICLE
Filed April 18, 1963  2 Sheets-Sheet 1
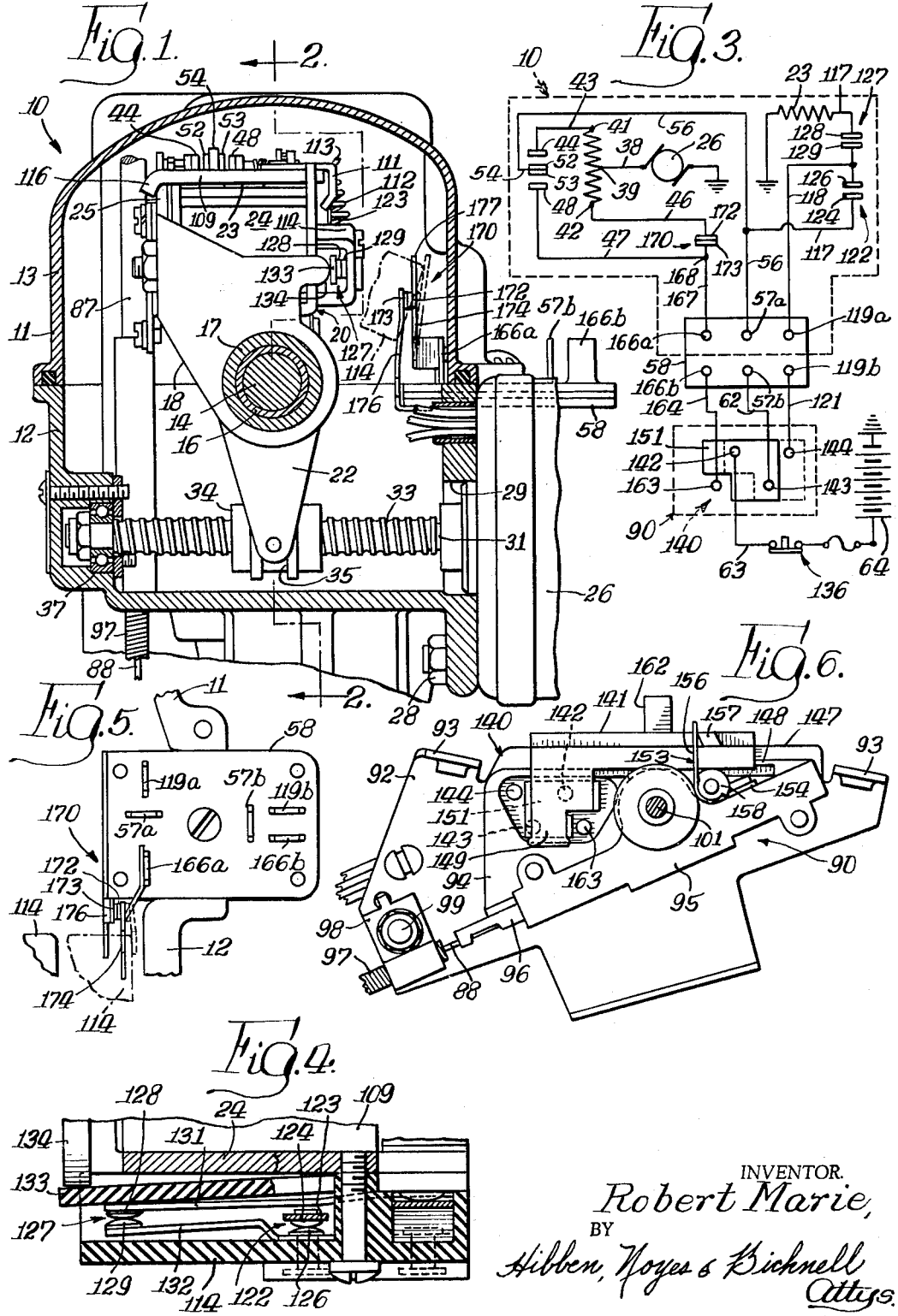
INVENTOR.
Robert Marie,
BY
Hibben, Noyes & Bicknell
Attys.

March 8, 1966  R. MARIE  3,239,026
SPEED CONTROL DEVICE FOR AN AUTOMOTIVE VEHICLE
Filed April 18, 1963  2 Sheets-Sheet 2
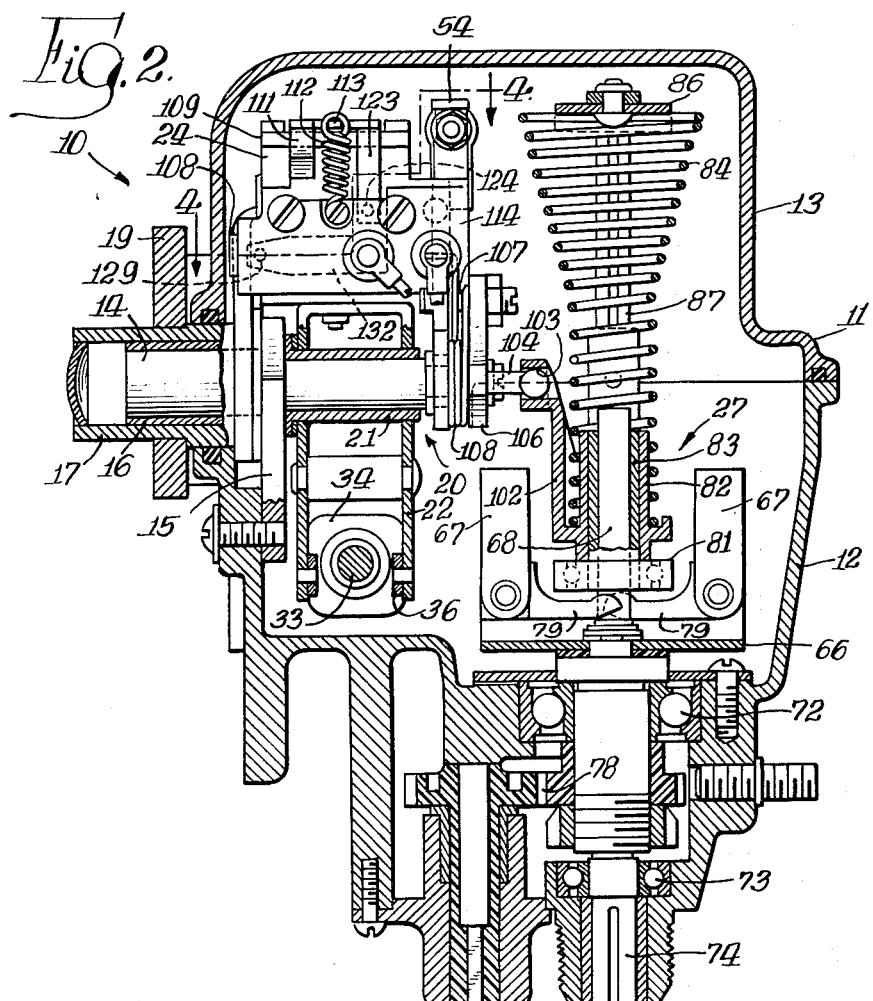
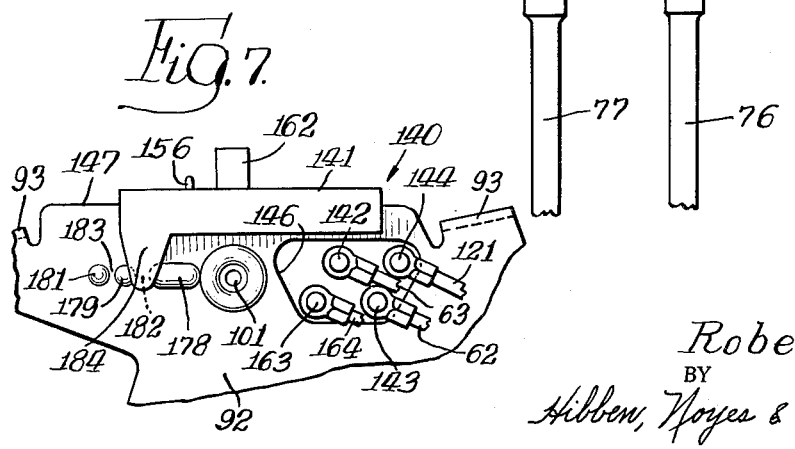
INVENTOR.
Robert Marie,
BY
Hibben, Noyes & Bicknell
Attys.

United States Patent Office 3,239,026
Patented Mar. 8, 1966

3,239,026
SPEED CONTROL DEVICE FOR AN
AUTOMOTIVE VEHICLE
Robert Marie, Wayne County, Ind., assignor, by mesne assignments, to Dana Corporation, Toledo, Ohio, a corporation of Virginia
Filed Apr. 18, 1963, Ser. No. 273,875
15 Claims. (Cl. 180—82.1)

This invention relates generally to speed control devices and more particularly to a speed control device for an automotive vehicle.

In the Ralph R. Teetor application for patent entitled "Speed Control Device for an Automotive Vehicle," Ser. No. 827,745, filed July 17, 1959, and now Patent No. 3,090,460, a speed control device is disclosed and claimed which, when installed on an automotive vehicle, is operable to offer resistance to advancing movement of the accelerator pedal or throttle control member of the vehicle when the former is advanced to a position effective to produce a predetermined vehicle speed and the vehicle attains such speed so that the driver is made aware of the speed of the vehicle. Such device may also be set to automatically maintain the vehicle at a substantially constant predetermined speed, without requiring the driver to maintain pressure on the accelerator pedal, the device being effective to maintain the predetermined speed regardless of changing road conditions. The predetermined speed at which the resistance occurs or at which the vehicle is automatically maintained may be adjusted by the driver. When the device is set to automatically maintain the vehicle at a predetermined speed, it may be disabled from such automatic operation by a slight actuation of the vehicle brake pedal so that the vehicle is returned to conventional or normal operation.

A principal object of the present invention is to provide a speed control device of the foregoing character, having novel manually controlled means, independent of the brake pedal and ignition switch, for rendering the device inoperable to provide resistance to advancing movement of the accelerator pedal.

Another object is to provide a speed control device of the foregoing character having novel manually controlled means permitting the driver to render the device wholly inoperable to provide such resistance or to automatically maintain the vehicle at a predetermined speed.

Other objects and advantages of the invention will become apparent from the following description and accompanying sheets of drawings, in which:

FIG. 1 is a fragmentary vertical sectional view of a speed control device embodying the features of the invention;

FIG. 2 is a sectional view taken along the line 2—2 of FIG. 1;

FIG. 3 is a wiring diagram of the electrical circuits of the device;

FIG. 4 is a somewhat enlarged fragmentary sectional view taken along the line 4—4 of FIG. 2;

FIG. 5 is a fragmentary plan view of a portion of the device illustrated in FIG. 1;

FIG. 6 is a side elevational view of a manually operated switch for controlling the operation of the device; and FIG. 7 is a fragmentary side elevational view of a portion of the opposite side of the switch illustrated in FIG. 6 and showing additional details of the construction thereof.

The device of the aforementioned Teetor application generally comprises an operating member or element adapted to be connected to the accelerator pedal or throttle control member of the vehicle for movement therewith, an actuating member engageable with the operating member, electrical drive means for moving the actuating member in opposite directions, and a governor responsive to vehicle speed and cooperating with the operating and actuating members for energizing the drive means for movement in opposite directions. Thus, when the vehicle reaches a predetermined speed, the governor causes the drive means to move the actuating member into engagement with the operating member to provide resistance to advancing movement of the accelerator pedal. Manually adjustable means, connected to the governor, is provided to vary the speed at which resistance to advancing movement of the throttle control member is encountered.

For automatic operation of the vehicle at the predetermined speed, such device includes electrical coupling means for coupling the actuating member to the operating member so that movement of the actuating member by the drive means maintains the operating member and hence the throttle control member in a position to hold the vehicle at the predetermined speed. Energization of the electrical coupling means is controlled by manually controlled means in the form of a switch associated with the manually adjustable means for adjusting the governor. The device also includes means for preventing automatic operation of the vehicle prior to engagement of the operating member with the actuating member. Such means comprises a normally open switch in circuit with the electrical drive means and mounted on the actuating member, the switch being closed by a projection on the operating member when the members are engaged. In addition, the means for varying the speed at which resistance will be encountered or the speed at which the vehicle will travel when under automatic operation is arranged to eliminate such resistance and prevent automatic operation when adjusted to set the governor at a certain high value. The device is also rendered inoperative for automatic operation by depression of the brake pedal of the vehicle.

While a speed control device which functions in the manner of the above described device greatly facilitates operation of a vehicle, it would also be advantageous to permit the driver to eliminate resistance to advancing movement of the accelerator pedal when the vehicle reaches or exceeds a predetermined speed without the necessity of manipulating the manually adjustable means to adjust the governor to a high value. In addition, it would also be advantageous to permit the driver to disable the device for automatic operation without adjustment of the governor to such high value, or having to depress the brake pedal of the vehicle.

The present device is similar to the device shown in the Teetor application in that it generally comprises an operating member adapted to be connected to the accelerator pedal or throttle control member of the vehicle for movement therewith, and a movable actuating member engageable with the operating member. Movement of the actuating member is effected by an electrical drive means adapted to be energized in response to movement of the operating and actuating members and a governor responsive to the speed of the vehicle. Thus, when the vehicle reaches a predetermined speed, the drive means moves the actuating member into engagement with the operating member to provide resistance to continued advancing movement of the accelerator pedal. Manually adjustable means connected to the governor is provided for adjusting the speed at which resistance to advancing movement of the throttle control member is encountered.

For effecting automatic operation of the vehicle at the predetermined speed, coupling means is provided for coupling the actuating member to the operating member so that movement of the actuating member by the drive means maintains the operating member and hence the throttle control member in a position to maintain the vehicle at the predetermined speed.

In addition to the foregoing elements, the present device includes novel manually controlled means including a movable member which is effective, when in one position, to render the device operable to provide resistance to advancing movement of the accelerator pedal. The present device is also effective, when the movable member is in another position, to cause the coupling means to couple the actuating member to the operating member to bring the vehicle under automatic operation, the movable member then being moved to the first-mentioned position to maintain the automatic operation. The present device is further effective, when the movable member is in still another position, to wholly disable the device to provide either resistance or to bring the vehicle under automatic operation.

In FIGS. 1 and 2, a speed control device embodying the features of the present invention is illustrated. Such a device is adapted to be mounted preferably under the hood of an automotive vehicle. The device 10 comprises a housing 11 which includes a lower portion 12 and a cover portion 13. Most of the movable parts of the device are supported on a stationary shaft 14 which extends through a wall of the housing 11. The shaft 14 has a flange portion 15 (FIG. 2) intermediate its ends, which is secured to the interior of the wall of the housing 11. A bushing 16 is carried on the shaft 14 to provide a bearing surface for the hub portion, indicated at 17, of an operating member 18. The hub portion 17 extends exteriorly of the housing 11 and has a plate member 19 mounted thereon which is adapted to be resiliently connected to the throttle control member and carburetor of the vehicle, as shown and described in the Teetor application.

As heretofore mentioned, the device 10 is adapted to provide resistance to advancing movement of the throttle control member when the vehicle reaches a predetermined speed and, when under automatic operation, to maintain the speed of the vehicle substantially constant at the predetermined speed, such speed being adjustable by the driver of the vehicle. In order to provide the aforesaid resistance to advancing movement of the throttle control member or accelerator pedal, the device 10 is provided with an actuating member or element 20 in the form of a lever, which is rotatably mounted on the shaft 14 within the housing 11 by means of a bushing 21. The actuating member 20 comprises a yoke having a pair of spaced downwardly extending arms 22 mounted on the bushing 21, and an electromagnet 23 is mounted on the connecting or platform portion of the yoke, the former being enclosed by a casing 24. The operating member 18 has its upper end bent to form a laterally extending plate or engaging portion 25 parallel to the axis of the operating member 18 and adapted to engage the casing 24 of the electromagnet 23.

The actuating member 20 is pivotally mounted on the shaft 14 for movement between a range of positions corresponding to the idle and full open positions of the accelerator pedal or throttle control member. Thus, the electromagnet casing 24 of the actuating member acts as a stop or abutment to limit advancing movement of the operating member and hence provide resistance to advancement of the accelerator pedal. To this end, drive means in the form of a reversible electric motor 26 mounted on the exterior of the housing 11 is provided for moving the actuating member 20 throughout its range of positions, and circuit means including mechanism responsive to the speed of the vehicle, in this instance a governor, indicated generally at 27, is provided to control the direction of rotation of the motor 26 and extent of movement of the actuating member 20. The motor 26 is mounted on the outside of the housing 11 as by nuts 28. The housing 11 is provided with an opening 29 for receiving the shaft, indicated at 31, of the motor 26. To provide the desired speed reduction and power with a minimum number of parts so that a relatively small motor may be used, the connection between the motor 26 and actuating member 20 is of the screw and nut type. Thus, the motor shaft 31 is extended at one end into the housing 11 in the form of a screw 33 located within the housing 11. Mounted on the screw 33 is a nut 34 of rectilinear form, the nut 34 being mounted between the arms 22 of the actuating member 20 for pivotal and radial movement as the arms 22 pivot about the shaft 14. The nut 34 is provided with grooves 35 on its opposite side to receive rollers 36 (FIG. 2) carried on the lower ends of the spaced arms 22. The end of the screw 33 is rotatably journalled in a bearing assembly 37 mounted in the side wall of the housing portion 12 opposite from the motor 26.

Thus, energization of the motor 26 in either direction is effective to move the nut 34 along the screw 33 to swing the actuating member 20 about the shaft 14. The operating member 18 is adapted to be swung in a clockwise direction, as viewed in FIG. 1, when the accelerator pedal is advanced to open the throttle of the engine, and when the predetermined speed of the vehicle is obtained, the motor 26 is adapted to be rotated in a direction to move the actuating member 20 in a counterclockwise direction into abutment with the operating member 18 and to swing the latter counterclockwise if necessary. Thus, the screw 33 will be rotated in such direction as to move the nut 34 to the right, as viewed in FIG. 1. The actuating member 20 will therefore be swung counterclockwise and the casing 24 of the electromagnet 23 will be moved into engagement with the laterally extending arm or engaging portion 25 of the operating member 18.

As shown in FIG. 3, current is supplied to one end of the armature winding of the motor 26 by a wire 38 connected to a point 39 intermediate the ends of its field winding. The other end of the armature winding is grounded. The respective ends of the field winding of the motor 26 are indicated at 41 and 42, the end 41 being connected by a wire 43 to a contact 44 carried by the operating member 18 and the end 42 being connected by wires 46 and 47 to a contact 48 carried by the actuating member 20. Current is selectively supplied to the contact 44 or 48 by engagement thereof with a contact 52 or 53, respectively, mounted on the opposite sides of the upper end of a pivotal arm 54 disposed between the contacts 44 and 48. The arm 54 is pivotally mounted on and insulated from the shaft 14 and receives current from a wire 56 which is connected to a terminal 57a within the housing 11 and mounted on a terminal block 58 (see FIGS. 1, 3, and 5) having a portion extending externally of the housing 11. A terminal 57b, located outside of the housing 11, is connected through the block 58 to the terminal 57a, and a wire 62 connects the terminal 57b with a novel manually controlled means 140 located remote from the device 10. The manually controlled means 140 includes a movable member in the form of a slide 141 (FIGS. 6 and 7) adapted to provide a connection between the wire 62 and a wire 63 which is connected to the vehicle battery, indicated at 64, as will be described more fully hereinafter.

As heretofore mentioned, energization of the motor 26 to effect pivotal movement of the actuating member 20 in opposite directions as viewed in FIG. 1 is dependent on the movement of the arm 54 and the action of the governor 27. The governor 27, in the present instance, comprises a weight carrier 66 (FIG. 2) having a pair of governor weights 67 pivotally mounted thereon. The carrier 66 is mounted on a vertically extending shaft 68 which is rotatably mounted in the housing 11 in an upper bearing assembly 72 and a lower bearing assembly 73. The lower end of the shaft 68 is provided with a connection 74 for receiving the end of a drive cable 76 connected to the transmission or propeller shaft of the vehicle, which rotates in timed relation with the speed of the vehicle. Another cable 77 is connected to the speedometer of the vehicle and is driven by and at the same speed as the drive cable 76 by gearing 78 within the housing 11.

The weights 67 tend to swing outwardly as the carrier 66 is rotated. Each weight 67 has an inwardly extending arm 79 which engages a thrust bearing 81 mounted on the upper end of the shaft 68. The bearing 81 is axially shiftable on the shaft 68 and engages the lower end of a sleeve 82 having a bushing 83 therein providing a bearing surface for movement of the sleeve 82. Outward movement of the weights 67 thus results in a proportionate upward movement of the sleeve 82, which movement is resisted by a trumpet shaped governor spring 84 the lower end of which engages the sleeve 82.

The downward compression force of the governor spring 84 on the sleeve 82 is adjustable by means of a cap 86 which engages the upper end of the spring 84, the cap 86 being mounted on the upper end of an axially shiftable vertically extending governor rod 87. The lower end of the rod 87 is connected to one end of the cable portion, indicated fragmentarily at 88 in FIG. 1, of a Bowden wire. The other end of the cable portion 88 is connected to a manually adjustable means 90 located at a convenient place for operation by the driver of the vehicle, in this instance on the dash panel of the vehicle.

As shown in FIG. 6, the manually adjustable means 90 comprises a plate-like bracket 92 having flanges 93 thereon for mounting the bracket 92 on the dash panel. The bracket 92 includes a plate-like insulating member 94 mounted thereon, and an elongated hollow guide 95 is formed on the lower edge of the member 94. A rack 96 is mounted in the guide 95 and the other end of the Bowden wire cable portion 88 is secured to the left end of the rack 96, as shown in FIG. 6. The cable portion of the Bowden wire is enclosed by a casing portion 97, the end of which may be secured to the bracket 92 by a clamp 98 and a screw 99.

Shifting of the rack 96 to effect movement of the Bowden wire cable 88 and thus movement of the governor rod 87 and cap 86 is achieved by rotation of a shaft 101 journalled in the member 94 and bracket 92. The shaft 101 has a pinion mounted thereon, the pinion meshing with the rack 96. A suitable dial (not shown), accessible from the front of the dash panel, may be secured to the shaft 101 for effecting rotation thereof and adjustment of the force of the governor spring 84.

The sleeve 82 is provided with an upwardly extending arm 102 which is offset relative to the axis of the shaft 68 and extends adjacent portions of the operating and actuating members 18 and 20, respectively. The upper end of the arm 102 has an opening 103 which receives the end of a transversely extending pin 104 mounted on the lower end of a bell crank 106. Another pin 107 at the upper end of the bell crank 106 extends transversely toward the arm 54 and into engagement therewith to move it in response to movements of the sleeve 82. A torsion spring 108 is mounted on the end of the shaft 14 and has its ends engaging the arm 54 and pin 107 to maintain these parts engaged. The spring 108 will yield to accommodate further movement of the pin 107 when movement of the arm 54 is arrested.

Thus, adjustment of the compression of the governor spring 84 varies the speed at which resistance to advancing movement of the accelerator pedal will be encountered or the speed at which the vehicle will travel when under automatic operation. The reaction force of the governor spring 84 is the force which acts on the arm 54 tending to pivot it in a clockwise direction as viewed in FIG. 1 or in a direction to bring the contact 53 into engagement with the contact 48. Such force is opposed by the centrifugal force of the governor weights 67 acting on the sleeve 82 and tending to pivot the arm 54 in a counterclockwise direction as viewed in FIG. 1 or in a direction to bring the contact 52 into engagement with the contact 44. The arm 54 is thus movable in opposite directions to cause selective closing of either pair of contacts 44, 52 or 48, 53, depending upon the speed of the vehicle and the position of the operating member 18 and the actuating member 20. Closing of the contacts 44, 52 will energize the side 41 of the field winding of the motor 26 to cause rotation thereof in a direction to swing the actuating member 20 in a counterclockwise direction as viewed in FIG. 1, and closing of the contacts 48, 53 will energize the side 42 of the field winding of the motor for rotation in a direction to swing the actuating member 20 in a clockwise direction. When the vehicle is traveling at the speed at which the governor 27 is set, neither pair of contacts 44, 52 or 48, 53, will be closed. The upper end of the lever 54 will then float between the contacts 44 and 48, as indicated in FIGS. 1 and 3.

With the foregoing structure and assuming that the contacts 44, 52 are brought into engagement by movement of the operating member 18 and arm 54, the motor 26 will be energized for the direction of rotation which drives the nut 34 to the right as viewed in FIG. 1 to cause the actuating member 20 to be swung counterclockwise until the electromagnet casing 24 engages the laterally extending portion 25 of the operating member 18. At this point, the driver experiences resistance to advancing movement of the accelerator pedal or clockwise movement of the operating member 18. Continued movement of the actuating member 20 pushes the operating member 18 in a counterclockwise direction, and when such forced movement of the operating member 18 causes the contacts 44 and 52 to separate, the circuit to the motor is broken and the motor 26 stops. This occurs at the predetermined or set speed for which the governor 27 is adjusted and, if the driver wishes to maintain such speed, he merely holds the accelerator pedal at the position where the operating member 18 abuts the electromagnet casing 24 of the actuating member 20. Because of the screw and nut connection between the actuating member 20 and the electric motor 26, the former cannot be moved by pressure on the accelerator pedal and a resistance to advancing movement of the accelerator pedal is thereby established at the predetermined speed. If the driver of the vehicle wishes or needs in an emergency to exceed the speed at which resistance occurs, the accelerator pedal may be advanced beyond the point at which resistance is met because of the resilient connection between the accelerator pedal and the operating member 18.

If the driver permits the accelerator pedal to move to an idle position and the speed of the vehicle decreases, or if road conditions result in a decrease in vehicle speed, such decrease is utilized to energize the motor 26 for rotation in the opposite direction. Such action occurs when the contact 53 on the arm 54 engages the contact 48 mounted on the actuating member 20. Thus, when the speed of the vehicle decreases, the governor 27 responds to such decrease in speed by causing the arm 54 to be swung clockwise as viewed in FIG. 1 until the contact 53 engages the contact 48. Current from the battery 64 may thus flow between the contacts 53 and 48 to the side 42 of the field winding of the motor by means of the wires 47 and 46. The motor 26 is thus energized for rotation in the opposite direction. Consequently, the nut 34 will move to the left as viewed in FIG. 1, and the actuating member 20 will be swung clockwise out of engagement with the operating member 18. If the accelerator pedal is moved to idle position and the speed of the vehicle decreases, the nut 34 moves to the extreme outer or left end of the screw 33. If the speed of the vehicle decreases to some extent and then remains steady, the nut 34 will be moved to the left until the contact 48 carried by the actuating member 20 moves out of engagement with the contact 53 on the arm 54. Current flow to the side 42 of the field winding of motor 26 is thus interrupted and the motor stops. The actuating member 20 will therefore remain in the position it occupies when the motor stops.

As heretofore mentioned, the device 10 is also adapted to maintain the vehicle at a substantially constant predetermined speed without the driver having to maintain pressure on the accelerator pedal. Thus, the operating member 18 is adapted to be coupled to the actuating member 20 so that the accelerator pedal or throttle control member will be held in a position to maintain the vehicle at the predetermined speed. To this end, the electromagnet 23 includes an armature plate 109 hinged on the electromagnet casing 24 so as to overlie the electromagnet 23, as shown in FIG. 1. The armature plate 109 includes a downwardly extending arm or stop 111 which engages the side of the electromagnet casing 24 to limit upward pivotal movement of the armature plate 109, and a spring 112 is secured at one end to a finger 113 on the armature plate 109 and at its other end to an insulating block 114 mounted on the side of the actuating member 20. The spring 112 is under tension and normally urges the armature plate 109 upwardly to an inoperative position. The free end of the armature plate 109 is bent to provide a hook 116 adapted to extend over the upper edge of the laterally extending portion 25 of the operating member 18 when the electromagnet 23 is energized to secure the operating member 18 to the actuating member 20.

Current is normally supplied to the electromagnet 23 by a wire 117 (FIG. 3) which is connected at one end to the wire 56 and at its other end to the electromagnet 23. The other end of the electromagnet 23 is grounded. For initially energizing the electromagnet 23, a wire 118 is provided, the latter being connected at one end to an intermediate point on the wire 117 and at its other end to a terminal 119a on the terminal block 58 within the housing 11. The terminal 119a is connected through the block 58 to another terminal 119b externally of the housing 11, and a wire 121 connects the terminal 119b with the manually controlled means 140. Movement of the slide 141 of the manually controlled means 140 to a selected position establishes a connection between the wire 121 and the battery 64, in a manner to be described hereinafter. Thus, actuation of the manually controlled means 140 to connect the wire 121 with the vehicle battery 64 completes a circuit to the electromagnet 23, to energize the latter and cause the armature plate 109 to be drawn toward the electromagnet 23 and to couple the operating member 18 to the actuating member 20 as previously described.

In order to eliminate the need for holding the slide 141 of the manually controlled means 140 in a position to maintain current flow through the wire 118, the device 10 includes a second or holding switch 122 located in the wire 117 between the connection of the wire 118 therewith and the connection of the wire 117 with the wire 56 (FIG. 3). The switch 122, which is normally open, is effective when closed to maintain the electromagnet 23 energized, when the operating and actuating members 18 and 20 are coupled, by establishing a parallel circuit to the electromagnet 23 through the wire 117. When established, such circuit permits the driver to release the slide 141.

The switch 122 is adapted to be closed upon movement of the armature plate 109 into engagement with the casing 24 and comprises a downwardly extending arm 123 (FIGS. 1, 2, and 4) having its upper end mounted for movement with the armature plate 109 but insulated therefrom, and its lower end extending through an opening in the insulating block 114. A contact 124 (FIGS. 2, 3, and 4) is carried on the lower end of the arm 123 and is spaced from another contact 126 mounted in the insulating block 114 when the armature plate 109 is in an upwardly pivoted or inoperative position with respect to the electromagnet 23. The switch 122 is adapted to be closed by movement of the armature plate 109 into engagement with the electromagnet casing 24 as in FIGS. 1 and 2. Current flow through the electromagnet 23 is thus maintained by means of the wires 117 and 56 when the slide 141 is shifted to a position interrupting current flow to the wires 121 and 118 but connecting the wires 56 and 62 to the source 64.

As in the speed control device described in the aforementioned Teetor application, the device 10 includes means in the form of a normally open switch 127 (FIGS. 1, 3 and 4) interposed in the circut to the electromagnet 23 and adapted to be closed only when the engaging portion 25 of the operating member 18 abuts the electromagnet casing 24. To this end, the switch 127 is placed in the wire 117 between the connection of the wire 118 therewith and the electromagnet coil 23. The switch 127 comprises a pair of contacts 128 and 129, the contact 128 being carried at one end of a laterally extending resilient arm 131 (FIGS. 1 and 4) mounted within the insulating block 114 and connected to the electromagnet 23. The contact 129 is carried at one end of a second arm 132 mounted in the insulating block 114 and connected to the wire 118 and thus to the battery 64 and to the contact 126 of the switch 122. An arm or insulating member 133 of flexible material, such as nylon, or the like, is also mounted within the block 114 so that its left end, as viewed in FIG. 4, extends outwardly of the block 114. The left or projecting end of the member 133 is adapted to be engaged by a finger 134 formed on the operating member 18 and of such length as to close the contacts 128 and 129 when the laterally extending portion 25 of the operating member 18 abuts the electromagnet casing 24. The arm 132 is normally spaced from the arm 131, when the members 18 and 20 are not engaged, so that the contacts 128 and 129 are held apart, as indicated in FIG. 3. The member 133 and arm 131 are sufficiently flexible so as to bend when engaged by the finger 134 so that the contacts 128 and 129 will close and permit current flow through the switch 127. Thus the switch 127 is effective to prevent energization of the electromagnet 23 and coupling of the operating member 18 to the actuating member 20 until the accelerator pedal is advanced to a position sufficient to move the operating member 18 into engagement with the actuating member 20.

The device 10 also includes a normally closed switch 136 (FIG. 3) disposed in the wire 63 which connects the manually controlled means 140 with the battery 64. The switch 136 is positioned adjacent the brake pedal of the vehicle and is adapted to be opened by movement thereof. Thus, upon operation of the vehicle brake, the device 10 is disabled for automatic operation until the brake is released and the slide 141 is momentarily shifted to position to provide current flow through the wires 121 and 118 to again energize the electromagnet 23, assuming the switch 127 is closed.

With the foregoing structure, the device 10 will function in a manner similar to the speed control device described in the aforementioned Ralph R. Teetor application. Thus, when the device 10 is adjusted for automatic operation to maintain the vehicle at a substantially constant predetermined speed with the electromagnet 23 energized and the operating member 18 coupled to the actuating member 20, the vehicle will be maintained at the predetermined speed with the driver's foot removed from the accelerator pedal or throttle control member. If the vehicle should fall below the predetermined speed, the governor will sense such decrease in speed and move the arm 54 in a direction to close the contacts 48 and 53, thereby energizing the motor 26 for rotation in a direction to move the actuating member 20 and operating member 18, which is coupled thereto, in a direction to open the throttle of the vehicle and cause the engine to deliver more power. Similarly, if the vehicle encounters an operating condition which would reduce the power requirements of the engine to maintain the predetermined speed and the speed of the vehicle increases, the governor will sense such speed increase and cause the arm 54 to move in a direction to close the contacts 44 and 52, thereby energizing the motor 26 for rotation in the opposite direction to close the throttle of the vehicle and reduce the power output of the engine. The speed of the vehicle will thus remain substantially constant. When the vehicle is in a stabilized operating condition and traveling at the predetermined speed, the arm 54 and its contacts 52 and 53 are disposed between and out of engagement with the contacts 44 and 48, as shown in FIG. 1.

The device 10 includes the manually controlled means 140 which, in this instance, comprises a switch located remote from the device 10 and preferably on the dash panel of the vehicle.

As shown in FIGS. 6 and 7, the manually controlled means 140 is mounted on the bracket 92 which also supports the manually adjustable means 90. The manually controlled means 140 includes a plurality of contacts formed by the heads of a series of rivets, indicated at 142, 143, and 144 (FIGS. 3, 6, and 7) which extend through the insulating member 94. The bracket 92 is provided with an opening 146 (FIG. 7) to expose the opposite ends of the contacts 142–144. The contacts 142, 143, and 144, are respectively connected to the wires 63, 62, and 121. The movable member or slide 141, which is also of insulating material, is elongated and has a generally inverted U-shaped cross sectional configuration so as to straddle the side edge, indicated at 147, of the bracket 92. The slide 141 is retained on the edge 147 by a longitudinally extending rib 148 (FIG. 6) formed in the outer surface of the insulating member 94 and extending into a longitudinal groove within the slide 141.

A downwardly extending portion 149 is formed on the left end of the slide 141, as viewed in FIG. 6, an L-shaped plate 151 of electrically conductive material, such as copper, is secured to the inner side of the portion 149 for engaging one or more of the contacts 142–143 on movement of the slide 141. As will be apparent from FIGS. 3 and 6, the plate 151 is arranged with one leg of the L extending longitudinally of the slide so as to be movable to engage either the contact 142 alone, or both the contacts 142 and 144 together, depending on the position of the slide 141. The other leg of the L extends downwardly of the bracket 92 so as to overlie the contact 143.

With the slide 141 positioned so that the plate 151 simultaneously engages the contacts 142, 143, and 144, current from the battery 64 will flow through the wire 121 to thus render the device 10 operable to automatically maintain the vehicle at the predetermined speed. Once the vehicle is under automatic operation with the electromagnet 23 energized and the operating member 18 coupled to the actuating member 20, it is no longer desirable to maintain the slide 141 in such position because, if the slide 141 were to remain in such position during automatic operation and the vehicle brake depressed, the vehicle would again be returned to automatic operation whenever the brake was released and the operating member 18 moved into engagement with the actuating member 20. However, if the slide 141 is returned to the position where the plate 151 engages only the contacts 142 and 143, automatic operation will be maintained because the switch 122 is closed and current will flow to the electromagnet 23 through the wires 56 and 117. When the slide 141 is so returned and the vehicle brake has been depressed to open the switch 136, automatic operation will not be reestablished because the holding switch 122 will have opened because of deenergization of the electromagnet 23.

For this purpose, a spring 153 is provided for returning the slide 141 to a position providing a connection only between the contacts 142 and 143 after the vehicle has been brought under automatic operation by movement of the slide to a position establishing a connection between the contacts 142, 143, and 144. The spring 153, in the present instance, is preferably of the torsion type having one end 154 fixed or secured to the insulating member 94 and its other end 156 extending upwardly for engagement with the slide 141. In the present instance, the end 156 is adapted to engage a lug 157 at one side of the slide 141. Clockwise movement of the end 156 beyond its position shown in FIG. 6 is prevented by a stop 158. Thus, when the slide 141 is shifted toward the left from its position illustrated in FIG. 6, the lug 157 engages the end 156 and causes the latter to swing in a counter-clockwise direction as the slide moves. Such movement is resisted by the force of the spring 153, and this force is utilized to return the slide 141 to its position illustrated in FIG. 6 wherein the contacts 142 and 143 alone are connected. The slide 141 may be provided with a tab 162 to which a suitable knob or handle (not shown) may be attached to facilitate movement of the slide 141 between its various positions.

Assuming that the slide 141 is positioned as illustrated in FIGS. 3 and 6, the plate 151 provides a connection between the contact 142 and the contact 143. Such position of the slide 141 is the position which renders the device 10 operable to provide resistance to advancing movement of the accelerator pedal at a predetermined speed of the vehicle. With the slide 141 so positioned, current from the battery 64 will flow through the wire 63 to the contact 142, through the plate 151 to the contact 143, and thence through the wire 62 to the terminal 57b on the terminal block 58. Current from the terminal 57b flows through the block 58 to the terminal 57a and thence is directed by the wire 56 to the arm 54 and the contacts 52 and 53 thereon. The device 10 will thus function to provide resistance in the manner previously described.

According to the present invention, it is desirable to permit the driver to render the device 10 wholly inoperable either to provide resistance to advancing movement of the accelerator pedal or to provide for automatic operation of the vehicle. In other words, it is desirable to provide manually controlled means, independent of the brake pedal of the vehicle for this purpose. Thus, assuming that the driver wishes to render the device 10 inoperatble to provide resistance to advancing movement of the accelerator pedal at the predetermined speed, he need only shift the slide 141 toward the right from its position illustrated in FIG. 6. When so positioned, the plate 151 establishes a connection between the contact 142 and another rivet or contact 163 (FIGS. 3 and 6) on the insulating member 114. Such connection permits current from the battery 64 to flow through a wire 164 (FIG. 3), connected to the contact 163, to a terminal 166b on the terminal block 58. The terminal 166b is connected through the block 58 to another terminal 166a. The latter is connected by a wire 167 to a connection 168 with the wire 46. Current may thus flow through the wire 46 and to the side 42 of the field winding of the motor 26 to drive the motor 26 in a direction to cause the actuating member 20 to be moved clockwise, as viewed in FIG. 1, until it reaches a limit position remote from the operating member 18. Such movement, of course, permits free movement of the accelerator pedal, as previously described, so that the vehicle is returned to conventional operation.

According to the present invention, it is desirable to deenergize the motor 26 when the latter has moved the actuating member 20 to such limit position. Accordingly, the device 10 includes means in the form of a normally closed switch 170 for interrupting the circuit to the side 42 of the field winding of the motor 26 to deenergize the latter when the actuating member 20 reaches the aforesaid limit position. The switch 170 is disposed in the wire 46 between its connection 168 and the side 42 of the field winding and is physically mounted on the terminal block 58 within the housing 11 (FIGS. 1 and 5) so as to lie in the path of movement of the actuating member 20. In the present instance, the switch 170 comprises a pair of normally closed contacts 172 and 173, the contact 172 being carried on a flexible arm 174 which has an offset portion mounted on an upstanding lug on the terminal block 58 and comprising the terminal 166a. The contact 173 is similarly mounted on a flexible arm 176 adjacent the arm 174 and also mounted on the terminal block 58. The arm 174 includes an upwardly extending portion 177 that is adapted to be engaged by the insulating block 114 on the actuating member 20 upon continued clockwise movement of the actuating member 20, as the latter reaches its limit position, the insulating block 114 in such position being indicated in dotted lines in FIGS. 1 and 5. Such position is beyond the wide open throttle position of the operating member 18. Thus, as the actuating member 20 swings in a clockwise direction, as viewed in FIG. 1, toward the limit position, the insulating block 114 will engage the upwardly extending portion 177 of the arm 174 to pivot the latter away from the arm 176 and cause the contacts 172 and 173 to separate. The switch 170 is thus opened and current flow to the motor 26 stopped. The device 10 is thus rendered wholly inoperative to provide resistance to advancing movement of the accelerator pedal, at any speed, and the vehicle is returned to conventional or normal operation. Thereafter, the driver may again render the device 10 operable to provide resistance merely by shifting the slide 141 from its position providing a connection between the contacts 142 and 163 to its position illustrated in FIG. 6 where the contacts 142 and 143 are connected.

When the vehicle is under automatic operation and the slide 141 is in the position shown in FIG. 6, depression of the brake pedal of the vehicle will disable the device 10 for automatic operation but will permit resistance to occur whenever the predetermined speed is reached. However, the driver may wish not only to disable the device for automatic operation but also to prevent resistance from occurring. Thus when the device is operating under automatic control, the slide 141 is positioned at the point where the plate 151 engages only the contacts 142 and 143. By moving the slide to the position where the plate 151 engages the contacts 142 and 163, not only is automatic control eliminated, but also resistance is prevented from occurring.

While the slide 141 should be freely movable from the position where the plate 151 engages the three contacts 142, 143, and 144, so that the spring 153 is free to move the slide, it is desirable to provide detent means to hold the slide in the position where the plate 151 engages only the contacts 142 and 143 or the position where the plate 151 engages the contacts 142 and 163. To this end, detent means in the form of a longitudinally extending upraised rib 178 (FIG. 7) and a pair of upraised hemispherical portions 179 and 181 are formed on the rear face of the bracket 92. The rib 178 and portion 179 thus define a recess 182 therebetween and the portions 179 and 181 define another recess 183 therebetween. The recesses 182 and 183 correspond to the two aforementioned positions of the slide 141 and are adapted to coact with a downwardly extending finger 184 formed on the slide 141 to hold the slide in the respective positions.

I claim:

1. A speed control device for an automotive vehicle having a throttle control element, said device comprising an operating member movable with said throttle control element from and toward an idle position, an actuating member movable toward and from said operating member, means including mechanism responsive to the speed of said vehicle for moving said actuating member to a position engaging said operating member to establish a resistance, at a predetermined vehicle speed, to advancing movement of said operating member, and manually controlled means operable when in one position to render said first-mentioned means effective at said predetermined speed to move said actuating member toward said operating member to establish said resistance, said manually controlled means also being operable when in another position to render said first mentioned means immediately effective regardless of the speed of the vehicle to move said actuating member to a limit position out of engagement with and remote from said operating member to eliminate said resistance at any vehicle speed.

2. The combination of claim 1, in which said first-mentioned means includes a reversible electric motor connected to said actuating member for moving the latter in opposite directions, and said manually controlled means comprises switch means in circuit with said electric motor and operable when in one position to render said first-mentioned means effective to energize said electric motor to selectively move said actuating member in opposite directions, said switch means being operable when in said other position to energize said electric motor to move said actuating member to said limit position.

3. The combination of claim 2, in which said first-mentioned means includes a pair of branch circuits for effecting rotation of said motor respectively in opposite directions, and said switch means includes a first contact in circuit with both of said branch circuits, a second contact in circuit with one of said branch circuits for effecting rotation of said motor in a direction to move said actuating member toward said limit position, and a manually movable member selectively movable into engagement with said first and second contacts.

4. The combination of claim 3, in which another switch is provided in said one branch circuit, said other switch being opened by said actuating member to deenergize said motor only when said actuating member reaches said limit position.

5. The combination of claim 4, in which said other switch is disposed in the path of movement of said actuating member so as to be engaged and opened thereby on movement of said actuating member to said limit position.

6. The combination of claim 1, including means operable by said actuating member only when the latter reaches said limit position for preventing said first-mentioned means from being rendered effective.

7. A speed control device for an automotive vehicle having a throttle control element, said device comprising an operating member movable with said throttle control element from and toward an idle position, an actuating member movable toward and from said operating member, means including mechanism responsive to the speed of said vehicle for moving said actuating member to a position engaging said operating member to establish a resistance at a predetermined vehicle speed to advancing movement of said operating member, said means including a reversible electric motor connected to said actuating member and a pair of branch circuits respectively connected to said motor for effecting rotation thereof in opposite directions, said branch circuits having switches therein operable when closed to permit a current flow through the respective branch circuits, a manually controlled switch effective when in one position to render said switches operable, said manually controlled switch also being effective when in another position to energize said motor for rotation in a direction to move said actuating member toward a limit position remote from said operating member, and another switch in circuit with said manually controlled switch when the latter is in said other position and being opened by said actuating member when the latter reaches said limit position.

8. A speed control device for an automotive vehicle having a throttle control element, said device comprising an operating member adapted to be connected to said throttle control element and movable in one direction on movement of said throttle control element away from idle position and in the opposite direction on movement of said throttle control element toward idle position, an actuating member movable in the same directions, means including mechanism responsive to the speed of said vehicle for moving said actuating member in said one direction when said vehicle is operating below a predetermined speed and in said opposite direction when said vehicle is operating above said predetermined speed, means for coupling said actuating member to said operating member to maintain said vehicle at a substantially constant predetermined speed, and manually controlled means operable when in one position to render said coupling means operable to couple said actuating member to said operating member, said manually controlled means also being operable after coupling of said members and when in another position to maintain said coupling and render said first-mentioned means operable to vary the position of said actuating member and hence the position of said operating member, said manually controlled means being also operable when in still another position to disable said coupling means and to cause said first-mentioned means to move said actuating member to a limit position out of engagement with and remote from said operating member.

9. A speed control device for an automotive vehicle having a throttle control element, said device comprising an operating member adapted to be connected to said throttle control element and movable in one direction on movement of said throttle control element away from idle position and in the opposite direction on movement of said throttle control element toward idle position, an actuating member movable in the same directions as said operating member and engageable therewith, electrical drive means including a reversible electric motor for moving said actuating member in opposite directions, circuit means including mechanism responsive to the speed of said vehicle for energizing said motor for rotation in one direction when said vehicle is operating below a predetermined speed and for energizing said motor for rotation in the opposite direction when said vehicle is operating above a predetermined speed, coupling means including an electromagnet and an armature carried by said actuating member for coupling said actuating member to said operating member, manually controlled means comprising a switch having a first contact in said circuit means, a second contact in circuit with said electromagnet, and a movable conductor member adapted to be connected to a source of electrical energy, said movable member being shiftable to a first position for connecting said first contact with said source and to a second position for connecting said second contact with said source, said movable member being operable to maintain said first contact connected with said source when shifted to said second position, said movable member being movable to a third position wherein said source is disconnected from both said first and said second contacts and is engaged with a third contact to thereby energize said motor to move said actuating member to a limit position out of engagement with and remote from said throttle control element.

10. The combination of claim 9, in which said switch includes a spring operable to urge said movable member to said first position when said member is moved to said second position.

11. A speed control device for an automotive vehicle having a throttle control element, said device comprising an operating member adapted to be connected to said throttle control element and movable from and toward an idle position, an actuating member movable in the path of movement of said operating member and engageable therewith, means including mechanism responsive to the speed of said vehicle for moving said actuating member in a direction toward said operating member to establish a resistance, at a predetermined vehicle speed, to advancing movement of the throttle control element, said mechanism also being operable to move said actuating member in a direction away from idle position when said vehicle is operating below said predetermined speed, means for coupling said operating member to said actuating member to maintain said vehicle at substantially said predetermined speed, and manually controlled means operable when in one position to render said first-mentioned means operable to move said actuating member in a direction to establish said resistance and when in another position to actuate said coupling means to couple said actuating member to said operating member, said manually controlled means also being operable when in still another position to render said coupling means inoperable and to cause said first-mentioned means to move said actuating member to a limit position out of engagement with and remote from said operating member to thereby eliminate said resistance to advancing movement of said throttle control element.

12. In a speed control device for an automotive vehicle having a throttle control element, said device comprising an operating member adapted to move with said throttle control element from and toward an idle position, an actuating member movable in the same directions as said operating member, a governor responsive to the speed of the vehicle, electrical drive means controlled by said governor and including a reversible electric motor for moving said actuating member in one direction when said vehicle is operating below a predetermined speed and in the opposite direction when said vehicle is operating above said predetermined speed, said electric motor having a pair of branch circuits respectively connected to said motor for effecting rotation thereof in opposite directions and movement of said actuating member from and toward idle position, means for coupling said actuating member to said operating member including an electromagnet mounted on one of said members and having an armature engageable with the other of said members for holding the members coupled when said electromagnet is energized, and manually controlled means comprising a manually operated switch controlling energization and deenergization of said electric motor and said electromagnet, said switch having a first contact in circuit with said electric motor, a second contact in circuit with said electromagnet, a third contact in circuit with the branch circuit of said electric motor causing rotation thereof in a direction to effect movement of said actuating member away from idle position and toward a limit position remote from said operating member, and a manually movable member for selectively connecting said contacts with a source of electrical energy.

13. The combination of claim 12, in which said movable member engages said first contact when engaged with said second contact.

14. A speed control device for an automotive vehicle having a throttle control element, said device comprising an operating member adapted to move with said throttle control element toward and from an idle position, an actuating member movable in the path of movement of said operating member and engageable therewith, a reversible electric motor connected to said actuating member for moving the latter, said electric motor having a pair of branch circuits controlling rotation thereof in opposite directions and movement of said actuating member in opposite directions, circuit means including mechanism responsive to the speed of said vehicle for energizing one of said branch circuits to move said actuating member away from idle position when said vehicle is operating below a predetermined speed and for energizing the other of said branch circuits when said vehicle is operating above said predetermined speed to move said actuating member toward idle position, coupling means including an electromagnet and an armature carried by said actuating member for coupling said actuating member to said operating member, and manually controlled means comprising a switch having a first contact in circuit with said electric motor, a second contact in circuit with said electromagnet, a third contact connected to said one branch circuit, and a movable conductor member adapted to be connected to a source of electrical energy for selectively connecting said source with said contacts to control operation of said device, said switch also including a spring urging said movable member away from said second contact and toward said first contact, whereby said movable member is automatically moved into engagement with said first contact alone when said member is moved into engagement with said second contact and is released.

15. A speed control device for an automotive vehicle having a throttle control element, said device comprising an operating member adapted to move with said throttle control element toward and from an idle position, an actuating member movable in the path of movement of said operating member and engageable therewith, a reversible electric motor connected to said actuating member for moving the latter, said electric motor having a pair of branch circuits controlling rotation thereof in opposite directions and movement of said actuating member in opposite directions, circuit means including mechanism responsive to the speed of said vehicle for energizing one of said branch circuits to move said actuating member away from idle position when said vehicle is operating below a predetermined speed and for energizing the other of said branch circuits when said vehicle is operating above said predetermined speed to move said actuating member toward idle position, coupling means including an electromagnet and an armature carried by said actuating member for coupling said actuating member to said operating member, and manually controlled means comprising a switch having a first contact in circuit with said electric motor, a second contact in circuit with said electromagnet, a third contact connected to said one branch circuit, and a movable conductor member adapted to be connected to a source of electrical energy for selectively connecting said source with said contacts to control operation of said device, said movable member maintaining said first contact connected to said source of electrical energy when said member is moved to a position engaging said second contact, said manually controlled means also including another switch in series with said third contact, said other switch being opened by said actuating member when the latter is moved to its limit position thereby deenergizing said drive means.

References Cited by the Examiner
UNITED STATES PATENTS 3,090,460    5/1963    Teetor _____ 180—82.1

BENJAMIN HERSH, *Primary Examiner.*

A. HARRY LEVY, *Examiner.*